No. 794,617. PATENTED JULY 11, 1905.
W. R. GREEN.
UTENSIL DRAINER.
APPLICATION FILED JULY 1, 1904.

Witnesses
Carlek Schafer
J. H. Birmingham

Inventor
Walter R. Green.
By John L. Kindt, Atty.

No. 794,617. Patented July 11, 1905.

UNITED STATES PATENT OFFICE.

WALTER R. GREEN, OF CHICAGO, ILLINOIS.

UTENSIL-DRAINER.

SPECIFICATION forming part of Letters Patent No. 794,617, dated July 11, 1905.

Application filed July 1, 1904. Serial No. 214,854.

*To all whom it may concern:*

Be it known that I, WALTER R. GREEN, a citizen of the United States, residing in the city of Chicago, county of Cook, and State of Illinois, have invented a new and useful Improvement in Utensil-Drainers, of which the following is a specification.

The object of this invention is to provide a utensil-drainer which is so arranged that it will fit any ordinary sized utensil and when placed in position will firmly clamp the upper rim of the utensil, thus allowing the water to be drained out of said utensil without any liability of spilling the contents therein or scalding the hands.

A further object of the invention is to provide a simple and convenient article of the character described which is very efficient and which can be cheaply manufactured and sold at a reasonable cost.

Figure 1:
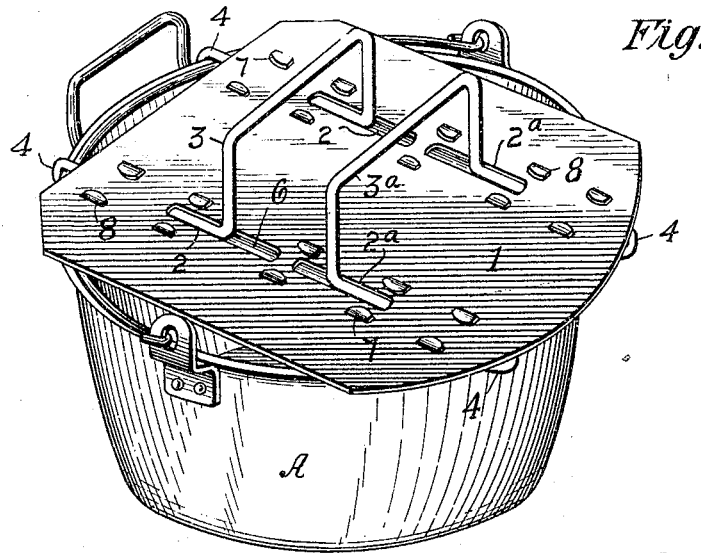
Figure 2:
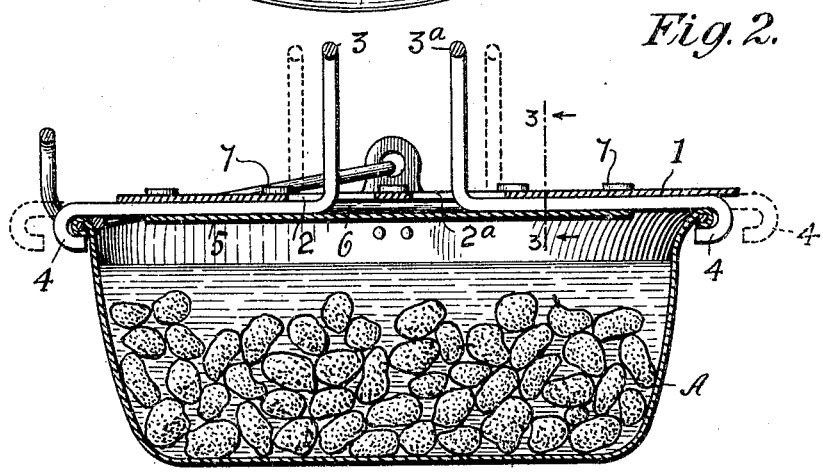
Figure 3:
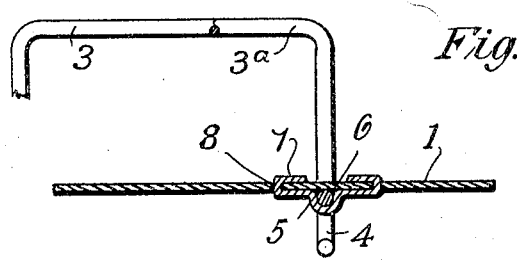

In the accompanying drawings, Figure 1 is a perspective view of my improved utensil-drainer, showing it in position upon a kettle. Fig. 2 is a cross-section of same, showing the handles in open and closed positions; and Fig. 3 is a sectional detail taken on line 3 3 of Fig. 2, showing the guideway for the handle.

1 indicates the body portion of the utensil-drainer, composed of tin or other metal and formed substantially in the manner as shown in the drawings. The body portion is provided with the oppositely-disposed slots 2 and $2^a$. Oppositely-disposed handles 3 and $3^a$ are provided, each of which is formed of one continuous piece of wire with the end portions thereof bent at right angles to the handles. The ends of these wires are passed through the slots 2 and $2^a$, respectively, and terminate in gripping-hooks 4.

5 indicates a strip of metal formed with the longitudinal groove 6 and is provided with a series of projections 7 on either side thereof. These projections are adapted to pass through the slots 8 in the body portion 1 and bent so as to firmly hold the strip 5 to said body portion. This construction allows that portion of the wire which is bent at right angles to the handle to slide in the longitudinal groove 4, thus holding the handles in operative position.

When it is desired to place the drainer on the kettle A, the handles 3 and $3^a$ are pushed apart, so as to allow the gripping-hooks 4 to pass over the rim of the kettle, (clearly shown in dotted lines in Fig. 2 of the drawings,) and when it is desired to grasp the kettle the handles 3 and $3^a$ are pulled together, thus causing the gripping-hooks 4 to engage the upper rim of the kettle, allowing the kettle to be carried from place to place or the water drained therefrom without any danger of the gripping-hooks 4 from becoming accidentally disengaged or the hands of the operator being scalded during the draining process.

Slight changes can of course be made in the general form and arrangement of the several parts described without departing from the spirit and scope of my invention. Hence I do not wish to be limited to the exact construction herein set forth.

What I claim as new, and desire to secure by Letters Patent, is—

A device of the character described, consisting of a flat body portion formed with two pairs of slots, the slots of one pair being in alinement with the slots of the other pair, two grooved strips of metal each strip being arranged under two of said alined slots, two handles each formed of a piece of wire having its ends extending through the grooves in the two strips and bent inwardly to form hooks and each having its central portion bent upwardly at right angles to the ends.

In testimony that I claim the foregoing as my invention I have signed my name in the presence of two subscribing witnesses.

WALTER R. GREEN.

Witnesses:
JAMES H. BIRMINGHAM,
K. SCHAFF.